(12) United States Patent
Jaiswal et al.

(10) Patent No.: US 12,380,102 B2
(45) Date of Patent: *Aug. 5, 2025

(54) SYSTEM AND METHOD FOR UPGRADING SPARKLINE CLUSTER WITH ZERO DOWNTIME

(71) Applicant: Oracle International Corporation, Redwood Shores, CA (US)

(72) Inventors: Puneet Jaiswal, Milpitas, CA (US); Devaraj Das, Fremont, CA (US); Devarajulu Kavali, Santa Clara, CA (US); Venkata Nagarjun Guraja, Santa Clara, CA (US); Sandeep Akinapelli, Fremont, CA (US); Vivek Kumar Pathak, Sagar, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,240

(22) Filed: Apr. 15, 2024

(65) Prior Publication Data
US 2024/0265013 A1 Aug. 8, 2024

Related U.S. Application Data

(63) Continuation of application No. 17/187,544, filed on Feb. 26, 2021, now Pat. No. 12,001,431.

(51) Int. Cl.
*G06F 9/54* (2006.01)
*G06F 8/656* (2018.01)
(Continued)

(52) U.S. Cl.
CPC ........ *G06F 16/24542* (2019.01); *G06F 8/656* (2018.02); *G06F 9/4856* (2013.01); *G06F 9/547* (2013.01); *G06F 16/2379* (2019.01)

(58) Field of Classification Search
CPC ................. G06F 8/65–66; G06F 9/45533–548
See application file for complete search history.

(56) References Cited

U.S. PATENT DOCUMENTS

2003/0033517 A1* 2/2003 Rutherglen ......... H04L 63/0281
713/153
2006/0130042 A1* 6/2006 Dias ....................... G06F 8/656
717/168
(Continued)

OTHER PUBLICATIONS

Kubernetes best practices: upgrading your clusters with zero downtime Sandeep Dinesh cloud.google.com/blog/products/containers-kubernetes/kubernetes-best-practices-upgrading-your-clusters-with-zero-downtime (Year: 2018).*

(Continued)

*Primary Examiner* — April Y Blair
*Assistant Examiner* — Paul V Mills
(74) *Attorney, Agent, or Firm* — Invoke

(57) ABSTRACT

The present embodiments relate to updating a dataflow interactive cluster with zero downtime. A request to update a first dataflow cluster can be received, and a second dataflow cluster can be generated as a replacement cluster to (Continued)

execute received queries. Generating the second dataflow cluster can include identifying a second series of executor nodes that are configured to execute queries from the gateway node via a second driver node. A first update to a configuration of a host configuration node can be performed to register the second dataflow cluster as an active endpoint and identify the first dataflow cluster as an inactive endpoint. When no active queries exist, a second update to the configuration can be provided to remove the first dataflow cluster from the configuration to direct subsequent queries from the gateway node to the second dataflow cluster.

20 Claims, 16 Drawing Sheets

(51) Int. Cl.
  *G06F 9/48* (2006.01)
  *G06F 16/23* (2019.01)
  *G06F 16/2453* (2019.01)

(56) References Cited

U.S. PATENT DOCUMENTS

| | | | | |
|---|---|---|---|---|
| 2013/0067051 | A1 | 3/2013 | Chadalapaka et al. | |
| 2015/0143354 | A1* | 5/2015 | Mathew | G06F 8/656 717/170 |
| 2016/0357549 | A1* | 12/2016 | Buzsaki | G06F 8/658 |
| 2017/0115978 | A1* | 4/2017 | Modi | G06F 8/65 |
| 2018/0039494 | A1* | 2/2018 | Lander | G06F 11/3688 |
| 2019/0095253 | A1* | 3/2019 | Curtis | H04L 67/34 |
| 2019/0250958 | A1 | 8/2019 | Kumar et al. | |
| 2019/0324741 | A1 | 10/2019 | Paskalev et al. | |
| 2020/0097280 | A1* | 3/2020 | Simeonov | G06F 8/656 |
| 2020/0097847 | A1 | 3/2020 | Convertino et al. | |
| 2021/0048998 | A1* | 2/2021 | Myers | G06F 8/63 |
| 2021/0049002 | A1 | 2/2021 | Myers et al. | |
| 2021/0173714 | A1 | 6/2021 | Huang et al. | |
| 2021/0406035 | A1* | 12/2021 | Price | G06F 11/3055 |

OTHER PUBLICATIONS

Perfecting smooth rolling updates in Amazon Elastic Container Service \Volodymyr Sorokin medium.com/engineering-at-grammarly/perfecting-smooth-rolling-updates-in-amazon-elastic-container-service-690d1aeb44cc (Year: 2019).*
The DASCOSA-DB Grid Database System Jon Olav Hauglid, Norvald H. Ryeng, and Kjetil Nørvag Grid and Cloud Database Management, Chapter 5 (Year: 2011).*
Minimizing Downtime During Deployments Ricardo Cardona Ramirez GitHub documentation for Application Gateway Ingress Controller commit bbf0af8 (Year: 2020).*
Graceful shutdown and zero downtime deployments in Kubernetes Daniele Polencic web.archive.org/web/20201001090555/https://learnk8s.io/graceful-shutdown (Year: 2020).*
Zero-Downtime Rolling Updates With Kubernetes Sebastian Daschner blog.sebastian-daschner.com/entries/zero-downtime-updates-kubernetes (Year: 2018).*
Notes on Graceful Shutdown in Kubernetes Farhan Ali medium.com/@_alif/graceful-shutdown-of-pods-in-kubernetes-6da5588b5356 (Year: 2020).*
Benefits of BI semantics in Spark SQL: A view through the TPCDS benchmark Harish Butani medium.com/@rhbutani/https-medium-com-oracle-snap-benefits-of-bi-semantics-in-spark-sql-a-view-through-the-tpcds-benchmark-5cca8d6d25d2 (Year: 2018).
Ignis: An efficient and scalable multi-language Big Data framework César Piñeiro, Rodrigo Martínez-Castaño, Juan C. Pichel (Year: 2020).
Scaling cloud-native Apache Spark on Kubernetes for workloads in external storages Piotr Mrowczynski Master's Thesis, KTH Royal Institute of Technology (Year: 2018).
Spark on Kubernetes using HopsFS as a backing store—Measuring performance of Spark with HopsFS for storing and retrieving shuffle files while running on Kubernetes KTH Royal Institute of Technology Shivam Saini (Year: 2020).
SQL Server Big Data Clusters—Data Virtualization, Data Lake, and AI Platform, 2nd edition Benjamin Weissman and Enrico van de Laar (Year: 2020).

* cited by examiner

SYSTEM AND METHOD FOR UPGRADING SPARKLINE CLUSTER WITH ZERO DOWNTIME

INCORPORATION BY REFERENCE; DISCLAIMER

Each of the following applications are hereby incorporated by reference: application Ser. No. 17/187,544 filed on Feb. 26, 2021. The applicant hereby rescinds any disclaimer of claims scope in the parent application(s) or the prosecution history thereof and advises the USPTO that the claims in the application may be broader than any claim in the parent application(s).

BACKGROUND

Computing devices can have access to one or more databases that can be used to execute various tasks. For example, a computing device can execute a query (e.g., a Structured Query Language (SQL) query, a Java Database Connectivity (JDBC) query, etc.) by processing database data. A gateway node can direct a query to a series of worker nodes to perform various query operations.

However, many computing devices may be required to perform updates. For example, a security patch may need to be installed to update various security features. As another example, a client may implement updates to a server to increase efficiency of query processes. In such instances, the computing device may incur a downtime to perform the updates, which may result in delaying of execution of queries by the computing device. This may result in lower quality user experience.

SUMMARY

Figure 1:
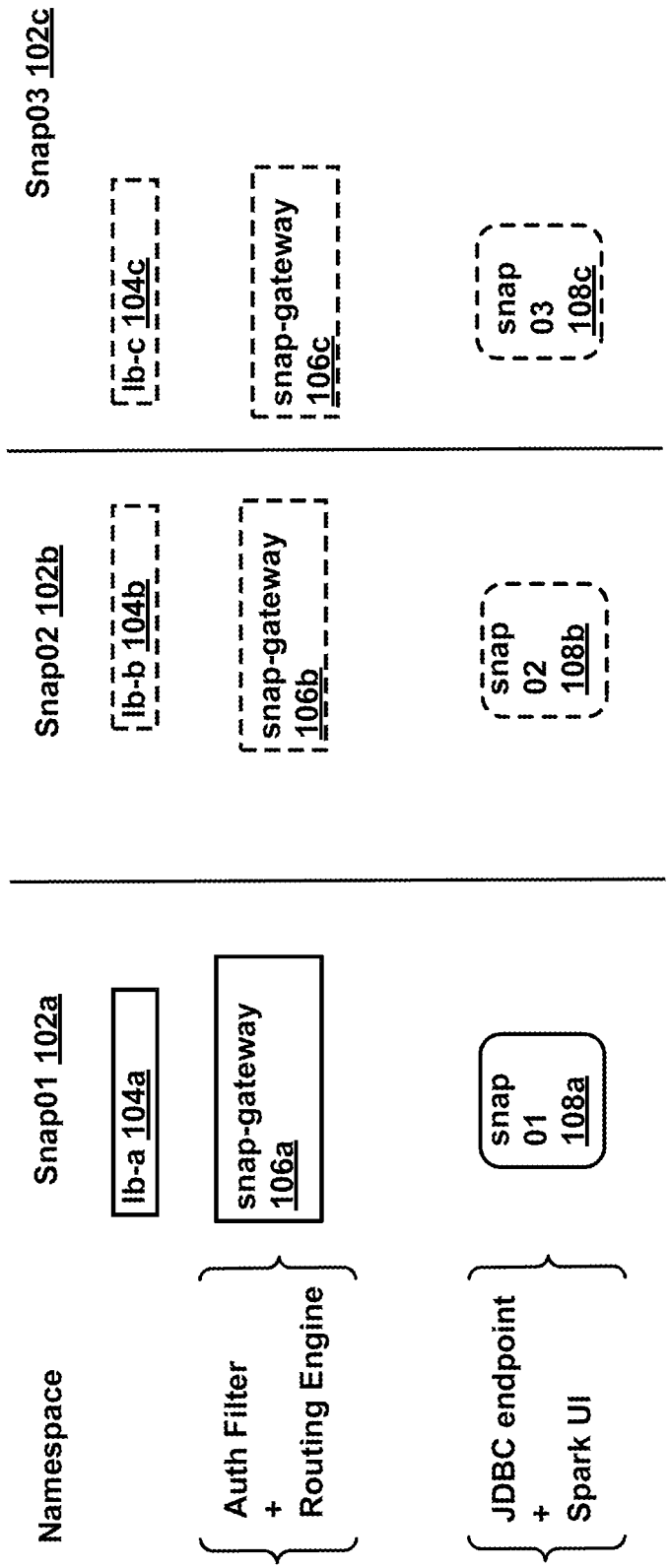
FIG. 1 is a block diagram illustrating an environment including multiple dataflow interactive clusters, according to at least one embodiment.

The present embodiments relate to updating dataflow interactive clusters with zero downtime. In first exemplary embodiment discloses a method. The method comprises obtaining a request to update a first dataflow cluster. The first dataflow cluster can direct query data from a gateway node to a first series of executor nodes to execute queries via a first driver node.

The method can also include generating a second dataflow cluster as a replacement to the first dataflow cluster. This can be performed responsive to obtaining the request to update the first dataflow cluster. Generating the second dataflow cluster can include identifying a second series of executor nodes from a new node pool that corresponds to the second dataflow cluster. The second series of executor nodes can be configured to execute queries from the gateway node via a second driver node. Generating the second dataflow cluster can also include causing a first update to a configuration of a host configuration node to register the second dataflow cluster as an active endpoint for subsequent queries and identify the first dataflow cluster as an inactive endpoint.

The method can also include causing a second update to the configuration of the host configuration node to remove the first dataflow cluster from the configuration. This can be performed responsive to determining that no active queries exist. The second update to the configuration can cause direction of subsequent query data from the gateway node to the second dataflow cluster.

A second exemplary embodiment discloses a non-transitory computer-readable medium. The non-transitory computer-readable medium includes a sequence of instructions which, when executed by a processor, causes the processor to execute a process. The process can include obtaining a request to update a first dataflow cluster. The first dataflow cluster can direct query data from a gateway node to a first series of executor nodes to execute queries via a first driver node.

The process can also include generating a second dataflow cluster. Generating the second dataflow cluster can include establishing a second series of executor nodes from a new node pool. The second series of executor nodes can comprise cache data mapping file system data for segment caching. Generating the second dataflow cluster can also include establishing a second driver node configured to forward queries from the gateway node to the second series of executor nodes. Generating the second dataflow cluster can also include causing a first update to a configuration of a host configuration node to register the second dataflow cluster as an active endpoint for subsequent queries and identify the first dataflow cluster as an inactive endpoint.

The process can also include causing a second update to the configuration of the host configuration node to remove the first dataflow cluster from the configuration. This can be performed responsive to determining that no active queries exist. The second update to the configuration can cause direction of subsequent query data from the gateway node to the second dataflow cluster.

A third exemplary embodiment discloses a system. The system can include a processor and a non-transitory computer-readable medium. The non-transitory computer-readable medium can include a sequence of instructions which, when executed by a processor causes the processor to execute a process. The process can include obtaining a request to update a first dataflow cluster configured to execute queries provided by a gateway node. The process can also include generating a second dataflow cluster as a replacement to the first dataflow cluster. The second dataflow cluster can comprise a second series of executor nodes. The second series of executor nodes can be configured to execute subsequent queries provided from the gateway node. The process can include causing a first update to a configuration to register the second dataflow cluster as an active endpoint for subsequent queries and identify the first dataflow cluster as an inactive endpoint. The process can also include causing a second update to the configuration to remove the first dataflow cluster from the configuration. This can be performed responsive to determining that no active queries exist. The second update to the configuration can cause direction of subsequent queries from the gateway node to the second dataflow cluster.

DETAILED DESCRIPTION

The present embodiments relate to updating dataflow interactive clusters with zero downtime. Dataflow interactive clusters can service a SQL workload while the cluster is active. However, there may be situations where an infrastructure update is required to update portions of the dataflow interactive clusters. Such updates can result in downtime of the dataflow interactive clusters.

Accordingly, the present embodiments include creating a new dataflow interactive cluster as a replacement cluster to the cluster being updated. The new cluster can be registered as a gateway, where the cluster being updated is marked as "Inactive" by a configuration mapping. This can result in new queries being handled by the new cluster with only existing queries being handled by the cluster to be updated. Responsive to no more existing queries, the cluster to be updated is removed from the configuration map and all new queries are directed by a gateway to the new cluster. This can result in a seamless transition to a new cluster to allow for cluster updates to occur with little (or zero) downtime. Reducing downtime in a dataflow interactive cluster environment can increase computational efficiency by processing queries with minimal delay while also increasing user experience in interacting with the dataflow interactive cluster.

FIG. 1 is a block diagram illustrating an environment 100 including multiple dataflow interactive clusters (e.g., cluster instances "01 102a," "02 102b," "03 102c"). For example, as shown in FIG. 1, each cluster instance (e.g., 102a-c), which can also be referred to as snap instances, can include a corresponding load balancer (e.g., 104a-c), gateway node (e.g., 106a-c), and a node (e.g., 108a-c). Multiple cluster instances (e.g., 102a-c) can be included in an environment (e.g., a virtual cloud network (VCN).

Multiple pods for each gateway instance can be set up for each dataflow-interactive cluster to ensure that the system is set up in an Active-Active mode. The dataflow-interactive cluster can be created under an engine cluster (e.g., Container Engine for Kubernetes (KE)), under a dedicated namespace responsive to receiving a create dataflow cluster request at a dataflow-interactive control plane. The control plane can also set up a gateway (e.g., 106a-c) exposing a JDBC endpoint and a UI for an analytics engine under the same KE namespace. The gateway can exposed through ingress controller service in container orchestration service (e.g., Kubernetes K8S). This ingress service can acquire a load balancer (LB) instance and binds the gateway as a backend for this LB. After the LB instance is set up, the control plane can bind a Domain Name System (DNS) name with this making it accessible to the end-user.

In some embodiments, a first dataflow cluster (e.g., cluster instance "01" 102a) can be generated. This can include creating the first dataflow cluster under a container engine with a dedicated namespace. Further, creating the first dataflow cluster can include associating the gateway node with the first dataflow cluster. The gateway node (e.g., gateway 106a) can expose a database connectivity application programming interface (API) under the dedicated namespace. The gateway node can be exposed via a host controller node. Creating the first dataflow cluster can also include updating the configuration at the host configuration node to bind a load balancing node of the first dataflow cluster to the gateway node by binding a domain name system (DNS) identifier to the dedicated namespace to allow access to the first dataflow cluster.

Each dataflow interactive cluster can include a first namespace (e.g., "01" 102a) with a cloud infrastructure load balancer (1b-a 104a). Each load balancers can be of various types (e.g., Micro—10 Mbps, Small—100 Mbps, Medium—400 Mbps, Large—8K Mbps) and can be implemented depending on a dataflow-interactive cluster shape. Each dataflow interactive cluster can also include a gateway 106a and a cluster instance 108a. Each gateway (e.g., 106a-c) can include an authentication filter and/or a routing engine.

Each cluster instance can comprise a JDBC endpoint and/or a UI. Gateway can provide access to both JDBC endpoint (default port 10001 and path/cliservice) and UI (default port 4040 and various paths) as the single endpoint and performs path-based routing. The instance can implement an authentication filter so it could authenticate both JDBC access and UI access in the same way.

Each gateway can service differing requests. For example, request types can include UI requests and/or JDBC specific requests. The JDBC specific requests can be served using Thrift over HTTPS. In other words, all the JDBC requests can land to '/cliservice' endpoint as a POST request. The thrift payload can contain the specific type of request.

Types of thrift requests that a client could send to a thrift server can include any of an "open/close session" request, an "execute statement" request, a "get" request (e.g., get—Info, TypeInfo, Catalogs, Schemas, Tables, TableTypes, Columns, Functions, Primary Keys), a "fetch results" request, a "cancel/close operation" request, a "get/cancel/renew delegation" request, etc.

In registering a backend to the gateway, there can be a 1 to 1 mapping between the gateway and dataflow-interactive-cluster. Backend information can be provided to the gateway at the time of startup. Responsive to performance of a dataflow-interactive cluster upgrade or replacement, there can be two dataflow-interactive clusters behind the gateway, one active dataflow-interactive cluster and another inactive dataflow-interactive cluster. In this way, the gateway may maintain the mapping of sessions originated from the dataflow-interactive-client to dataflow-interactive-cluster.

To keep the state and mapping data, each gateway can maintain its own local cache. Further, any state written from outside can reside in a shared datastore provided by K8S—configuration Map and the gateway would poll this store periodically to update its local state.

Figure 2:
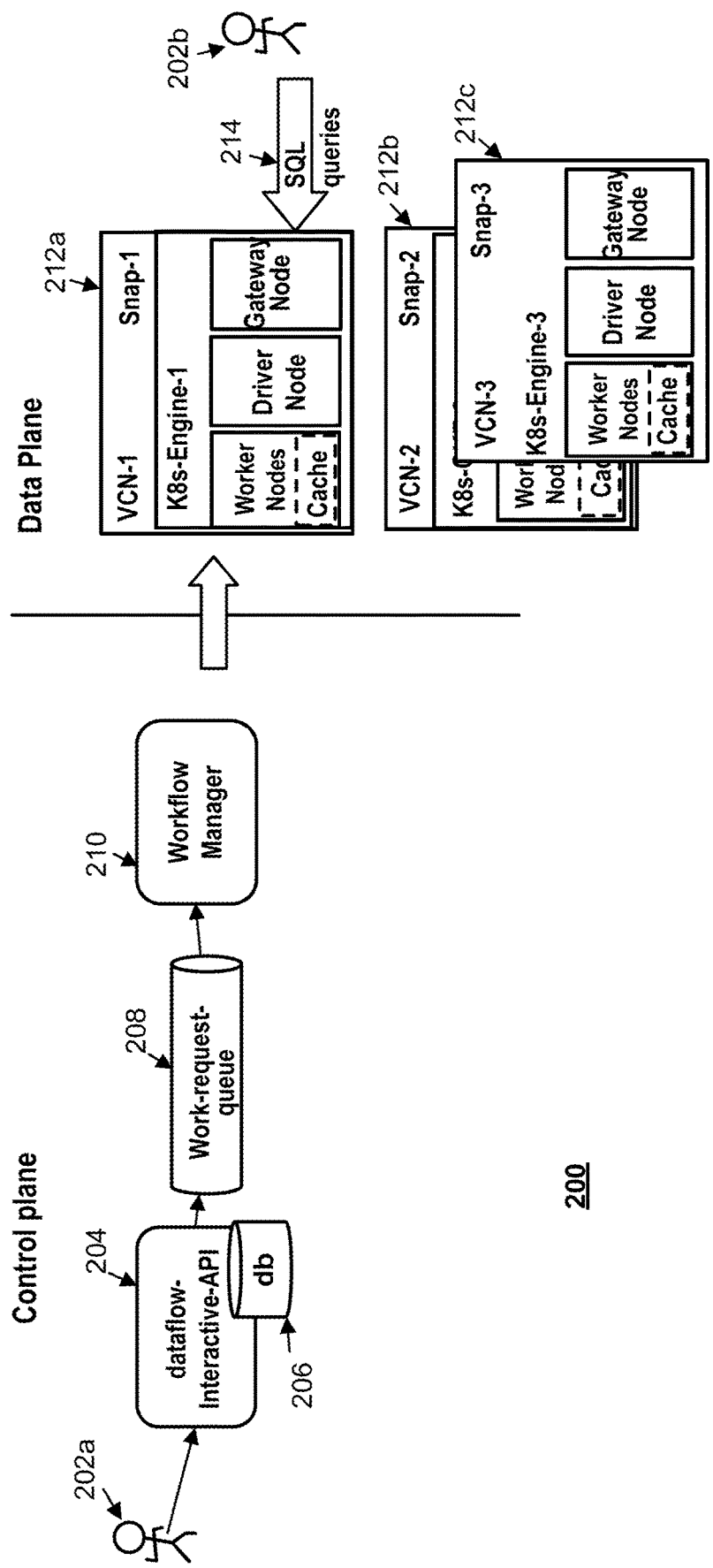
FIG. 2 is a block diagram illustrating a dataflow interactive cluster 200, according to at least one embodiment.

FIG. 2 is a block diagram illustrating a dataflow interactive cluster 200. As shown in FIG. 2, a user (e.g., 202a) interacting with a control plane of the cluster 200 can manage a dataflow interactive cluster (e.g., VCN-1, VCN-2, VCN-3) via a control plane API. Particularly, the user can interact with the dataflow interactive cluster via a work request queue 208 and a workflow manager 210 that is accessible via the dataflow interactive API 204. Various types of control plane data, such as modifications to the cluster, for example, can be stored by database (db) 206. The user, via the control plane, can access the data plane via a gateway endpoint for sending JDBC queries. From the data plane, queries (e.g., SQL queries 214) can be processed at various VCN instances 212*a-c*.

Figure 3:
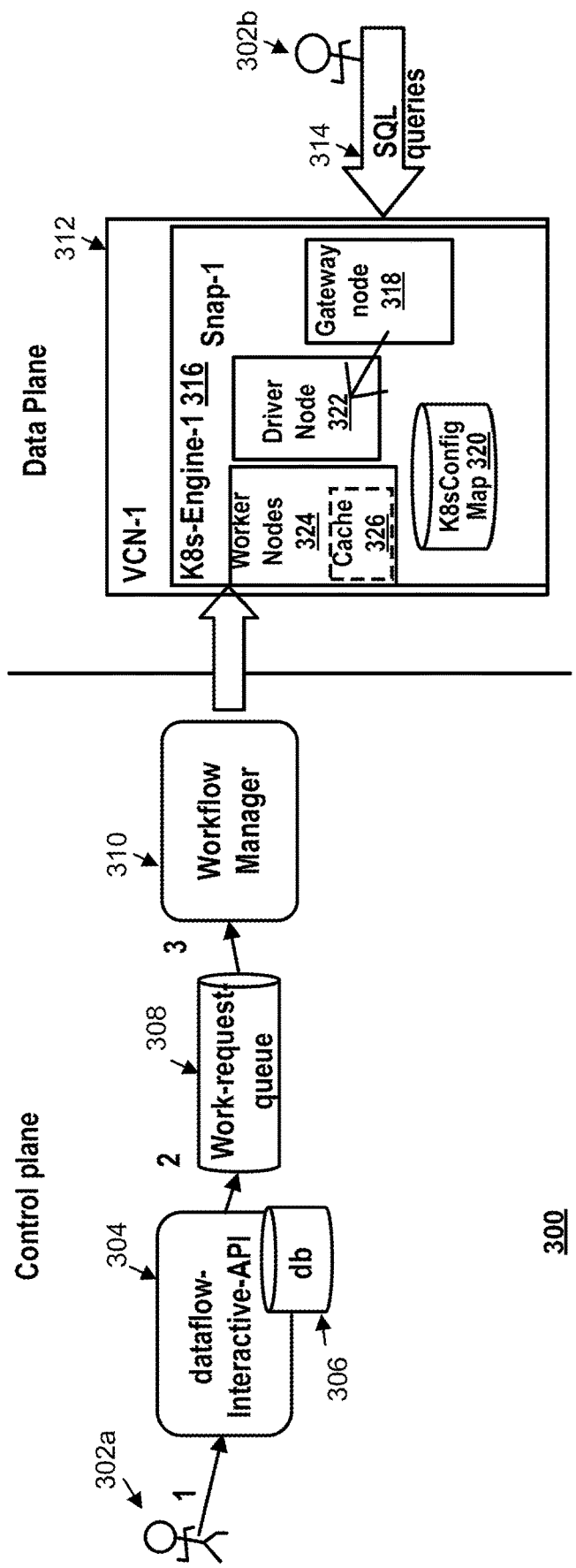
FIG. 3 is an illustration of a dataflow interactive cluster 300 for an upgrade API call, according to at least one embodiment.

FIG. 3 is an illustration of a dataflow interactive cluster 300 for an upgrade API call. In a first step, the user (e.g., 302*a*) can provide an upgrade command to the dataflow interactive API 304 for the target cluster (e.g., cluster instance 1). In a second step, the API 304 can log the request to a database (db) 306 and queue the request to a work request queue 308. In a third step, the work flow manager 310 can obtain the upgrade work request and plan for orchestration with the data plane.

In some embodiments, the upgrade API call can include a request to update a first dataflow cluster. The first dataflow cluster can direct query data from a gateway node to a first series of executor nodes to execute queries via a first driver node. The request to update the first dataflow cluster can indicate a request to provide any of a security patch, a container engine version update, and a dataflow-interactive upgrade. The request to update the first dataflow cluster is obtained by a workflow management node. Further, the request to update the first dataflow cluster can be received by the workflow management node via a dataflow interactive API.

As noted above, a dataflow interactive cluster may be updated for any of a number of reasons. For example, the cluster may be updated due to a security patch, a K8S (KE) version upgrade, a dataflow interactive upgrade, etc.

Further, as shown in FIG. 3, queries 314 can be directed from a gateway node 318 to a driver node 322 in a K8S-Engine-1 316. The gateway node 318 can direct queries 314 based on a configuration provided by the K8S configuration map 320. As described herein, the gateway node 318 can maintain a local configuration map that is periodically updated from the configuration maintained by K8S configuration map 320.

Figure 4:
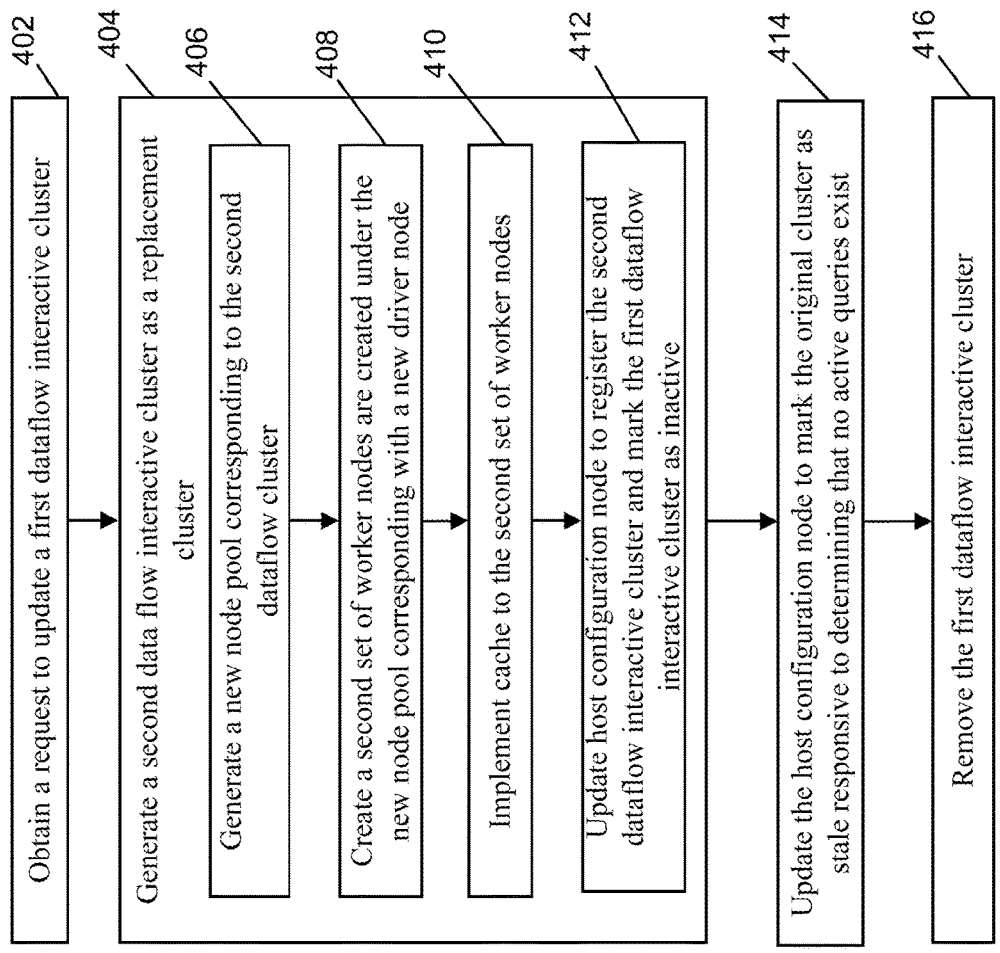
FIG. 4 is a block diagram of a process for performing an upgrade of a dataflow interactive cluster with zero downtime, according to at least one embodiment.

FIG. 4 is a block diagram of a process for performing an upgrade of a dataflow interactive cluster with zero downtime. At step 402, the system can obtain a request to update a first dataflow cluster. The first dataflow cluster can be configured to direct a first data stream from a gateway node to a first series of executor nodes to execute the first query via a first driver node.

At step 404, the system can generate a new dataflow interactive cluster as a replacement cluster (e.g., otherwise referred to as a second dataflow cluster) to replace a cluster that is to be upgraded. The replacement cluster can be created based on a request to upgrade the cluster (e.g., the request provide in step 402). The replacement cluster can be registered as a new backend in a gateway, marking the old backend as inactive. This information can be populated into a K8s-Config Map by the control plane, and each gateway can periodically read this to update the backend list. The system (e.g., via a K8s-Config Map) can maintain a list of backends for handling queries. For example, the replacement backend can be listed as active and the previous backend can be listed as inactive.

In some embodiments, a query request obtained at the dataflow interactive cluster can be for an entirely new query (e.g., a new query submission) or for an existing query (e.g., a result fetch request). Queries running already on the INACTIVE backend can keep running until completed. No more queries will then be issued for this backend. New Queries can be directed to the new dataflow-interactive Cluster.

At step 406, generating a new replacement cluster can include generating a new node pool corresponding to the second dataflow cluster. A new node pool can be created for driver and the driver node is created under this node pool. Generating a new node pool is discussed in greater detail with respect to FIG. 5A.

At step 408, a set of worker nodes can be created under the new node pool that correspond with a driver node. The new node pool can be used for generation of a second driver node and a second set of executor nodes that correspond to the second driver node. Creating the worker nodes is discussed in greater detail in FIG. 5B.

At step 410, the replacement cluster can implement cache for the second set of worker nodes. The cache can be utilized to execute SQL queries. The cache can include an executor level FileSystem-Segment cache to accelerate SQL query execution. The file system (a block store) can be mapped and can be used for Segment Caching in the same way it was mapped with executors in the original cluster. The cache can include data similar to the cache (e.g., cache 520) as described in FIG. 5C, for example.

At step 412, the configuration hosted by a host configuration node can be updated to register the second dataflow interactive cluster and mark the first dataflow interactive cluster as inactive. A workflow manager can register the new driver endpoint in a k8s-host-config-map and mark the old cluster as inactive. The gateway can update its backend list, routing new query requests to the new cluster while keeping old query-requests with the old cluster. This can include causing a first update to a configuration of a host configuration node to register the second dataflow cluster as an active endpoint for subsequent queries and identify the first dataflow cluster as inactive. Updating the K8S host configuration map is discussed in greater detail in FIG. 5D.

At step 414, the configuration at the host configuration node can be updated to mark the original cluster as stale responsive to determining that no other active queries exist. Once the gateway node notices there are no active queries served by the old dataflow-interactive cluster, it can mark the old backend isStale=true in the configuration map. Responsive to determining that no active queries exist, causing a second update to the configuration to remove the first dataflow cluster from the configuration, causing direction of a second data stream from the gateway node to the second dataflow cluster. Removing the first dataflow cluster from the configuration is discussed in greater detail with respect to FIG. 5E.

At step 416, the first dataflow interactive cluster can be removed. Once the old dataflow-interactive cluster drains or an upgrade timeout (e.g. 30 minutes—configurable) has reached, the old dataflow-interactive Cluster can be removed. In some instances, if a few queries have not finished or a timeout has reached, these queries can be failed/removed. Removing the first dataflow interactive cluster is discussed in greater detail in FIG. 5F.

FIGS. 5A to 5E provide block diagrams of a dataflow interactive cluster 500A-F performing a zero downtime upgrade of a dataflow interactive cluster. The cluster can include both a control plane and data plane. At the control plane, a workflow manager 502 can interact with the data plane to initiate modifications to the data plane as described below.

The data plane can include a VCN (e.g., VCN-1 504) that includes an engine (e.g., K8s-Engine-1 508). The engine 508 can comprise multiple instances (e.g., 510*a* and 510*b*). Each instance 510*a-b* can comprise a dataflow cluster as described herein. For example, instance 1 510*a* can include a first dataflow cluster to be replaced and instance 1' 510*b* can include a second dataflow cluster to replace the first dataflow cluster.

The VCN 504 can include a gateway node 514 configured to direct SQL queries 506 based on a configuration maintained by a K8s Host configuration map 512. For example, a query can be directed from gateway node 514 to the worker nodes 1 518 via driver node 1 516. The worker nodes 1 518 can comprise cache 520.

Figure 5A:
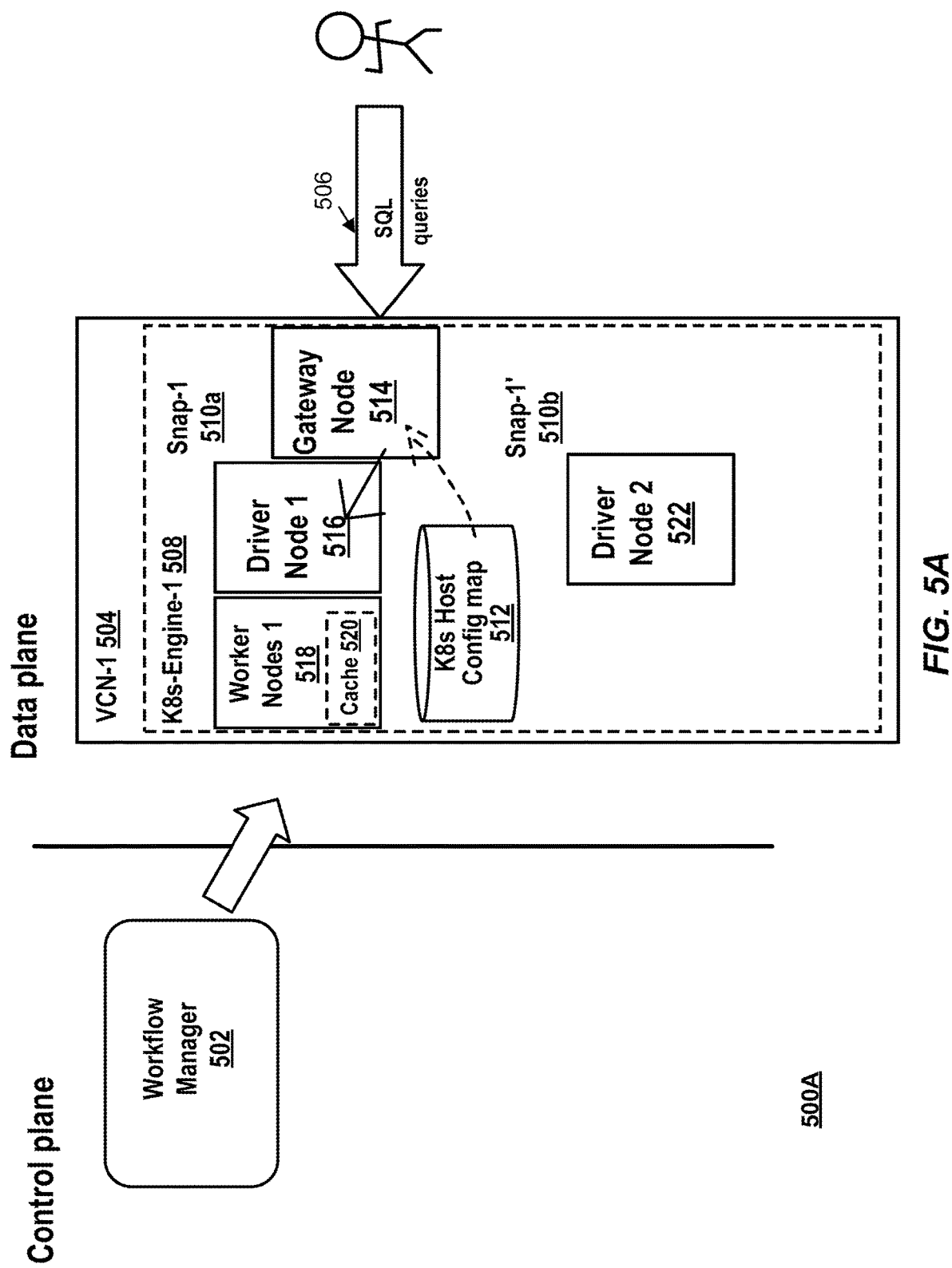
FIGS. 5A to 5F provide block diagrams for performing a zero downtime upgrade of a dataflow interactive cluster, according to at least one embodiment.

FIG. 5A illustrates the generation of a new cluster instance. For example, the new cluster instance 1' 510*b* can be generated. This can include a new node pool being created for a new driver (driver node 2 522). Generating a new cluster instance can include generating a second dataflow cluster as a replacement to the first dataflow cluster. This can be performed responsive to obtaining the request to update the first dataflow cluster.

Figure 5B:
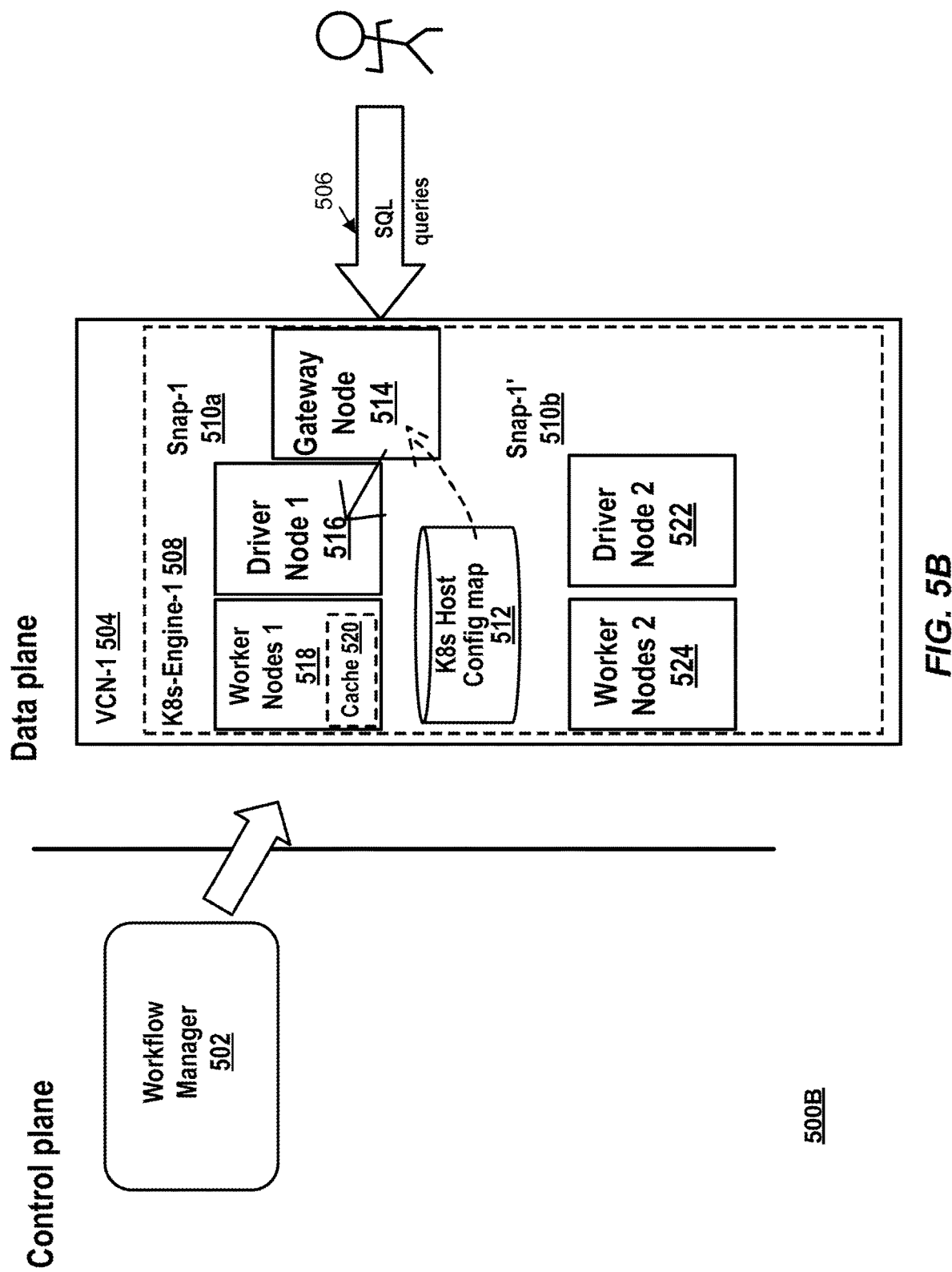

FIG. 5B illustrates generation of a set of worker nodes for the new cluster instance. The new node pool can be associated with a set of worker nodes (e.g., worker nodes 2 524). The second set of worker nodes 524 can be used in execution of subsequent queries, as described below.

Figure 5C:
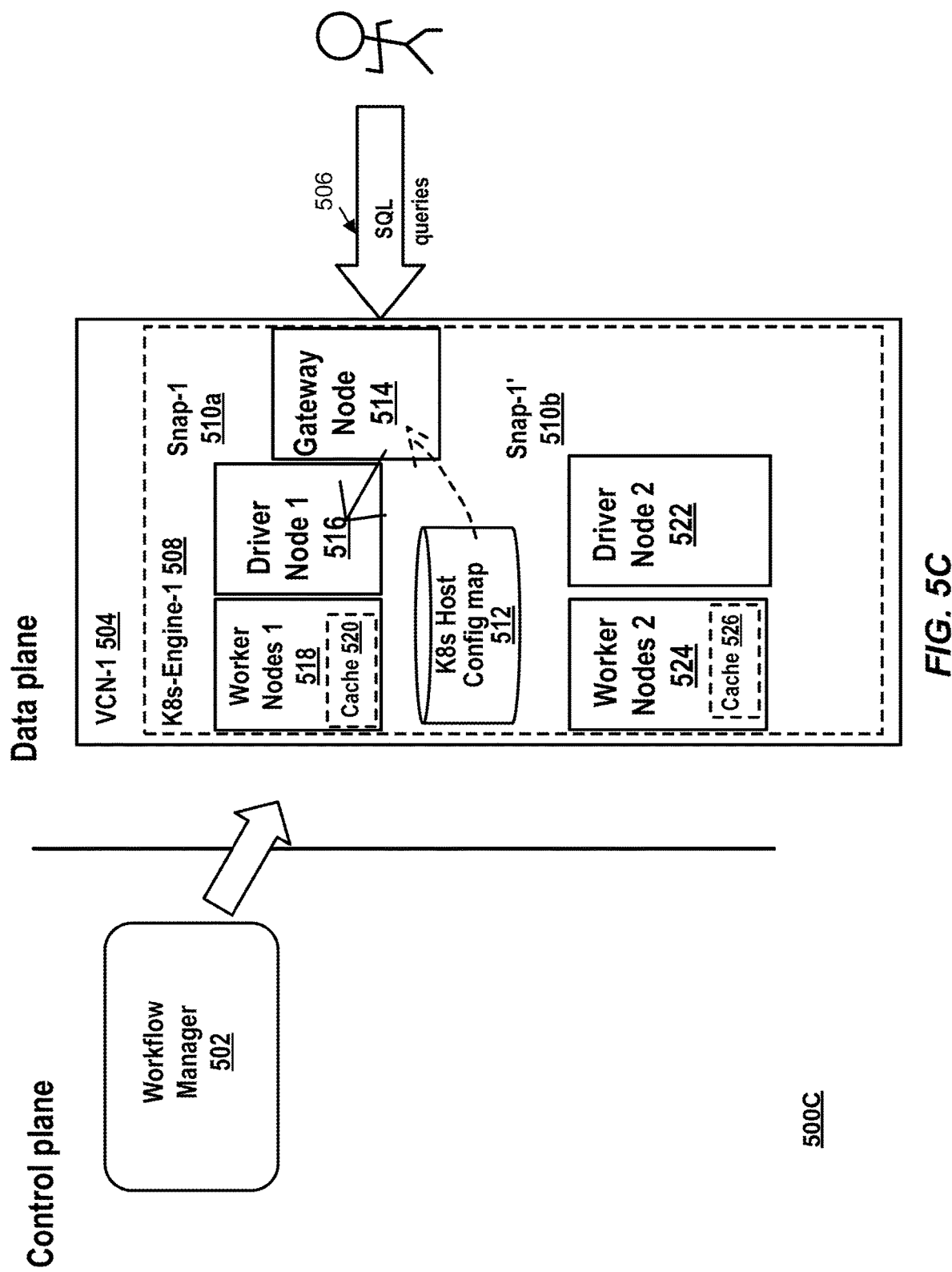

In some embodiments, generating the set of worker nodes can include identifying a second series of executor nodes from a new node pool that corresponds to the second dataflow cluster. The second series of executor nodes can be configured to execute queries from the gateway node via a second driver node FIG. 5C illustrates generation of a set of worker nodes that include cache. As shown in FIG. 5C, the second set of worker nodes 524 can include cache 526. The cache can include executor level FileSystem-Segment cache to accelerate SQL query execution. To provide the same level of performance in the new cluster, file system (Block Store) used for Segment Caching can be mapped in the same way it was mapped with executors in the original cluster. The cache 526 can include similar features or be the same as cache 520 included with the first set of worker nodes 518.

Figure 5D:
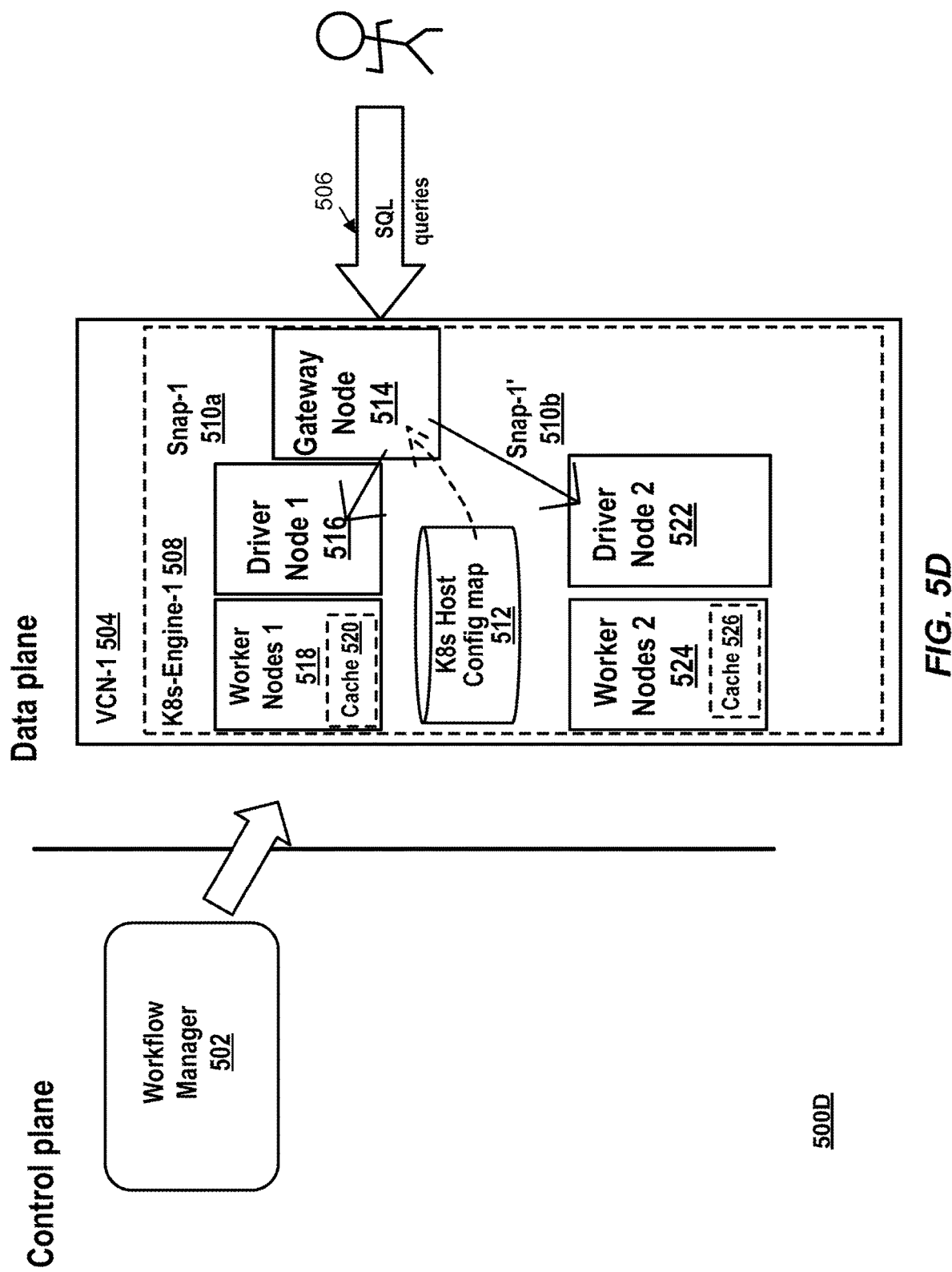

FIG. 5D illustrates a first update of a host configuration map. The first update can include an update to identify the new cluster (e.g., cluster instance 1' 510*b*). The workflow manager 502 can cause a first update to a configuration of a host configuration node to register the second dataflow cluster as an active endpoint for subsequent queries and identify the first dataflow cluster as an inactive endpoint. In some embodiments, the second series of executor nodes comprise cache data mapping file system data for segment caching. The cache data mapping file system data for segment caching can be included in both the first series of executor nodes and the second series of executor nodes.

In some embodiments, the query data includes a database connectivity query and is served by the gateway node over Hypertext Transfer Protocol Secure (HTTPS). Further, the database connectivity query can be forwarded to the first dataflow cluster when the configuration provides that the first dataflow cluster is active or inactive. This can be performed responsive to determining that the database connectivity query is associated with a previously-provided query. Further, the database connectivity query can be forwarded to the second dataflow cluster according to the configuration responsive to determining that the database connectivity query is associated with a new query.

Further, the first update can include marking the first cluster (e.g., instance 1 510*a*) as inactive. This can indicate that the gateway node 514 may only direct existing queries to the first instance 510*a* while directing new queries to the second instance 510*b*. Updating the host configuration can include the workflow manager 502 updating the K8s host configuration map at the K8s host configuration map 512 to identify the new cluster as active and the old cluster as inactive. The gateway 514 can update its backend list to route new query requests to the new instance 510*b* while keeping old query-requests with the old instance 510*a*. This can include calling both backends in two threads and collecting a response. For example, one thread would provide a successful result (indicating that the gateway can handle the query) and the other thread can provide a failed status (e.g., 404).

An example configuration of the host configuration map is as follows:

```
[{
    Name: Snap-1-backend
    Address: 192.168.0.2
    isActive: false
    isStale: false
},{
    Name: Snap-1'-backend
    Address: 192.168.0.3
    isActive: true
    isStale: false
}]
```

Figure 5E:
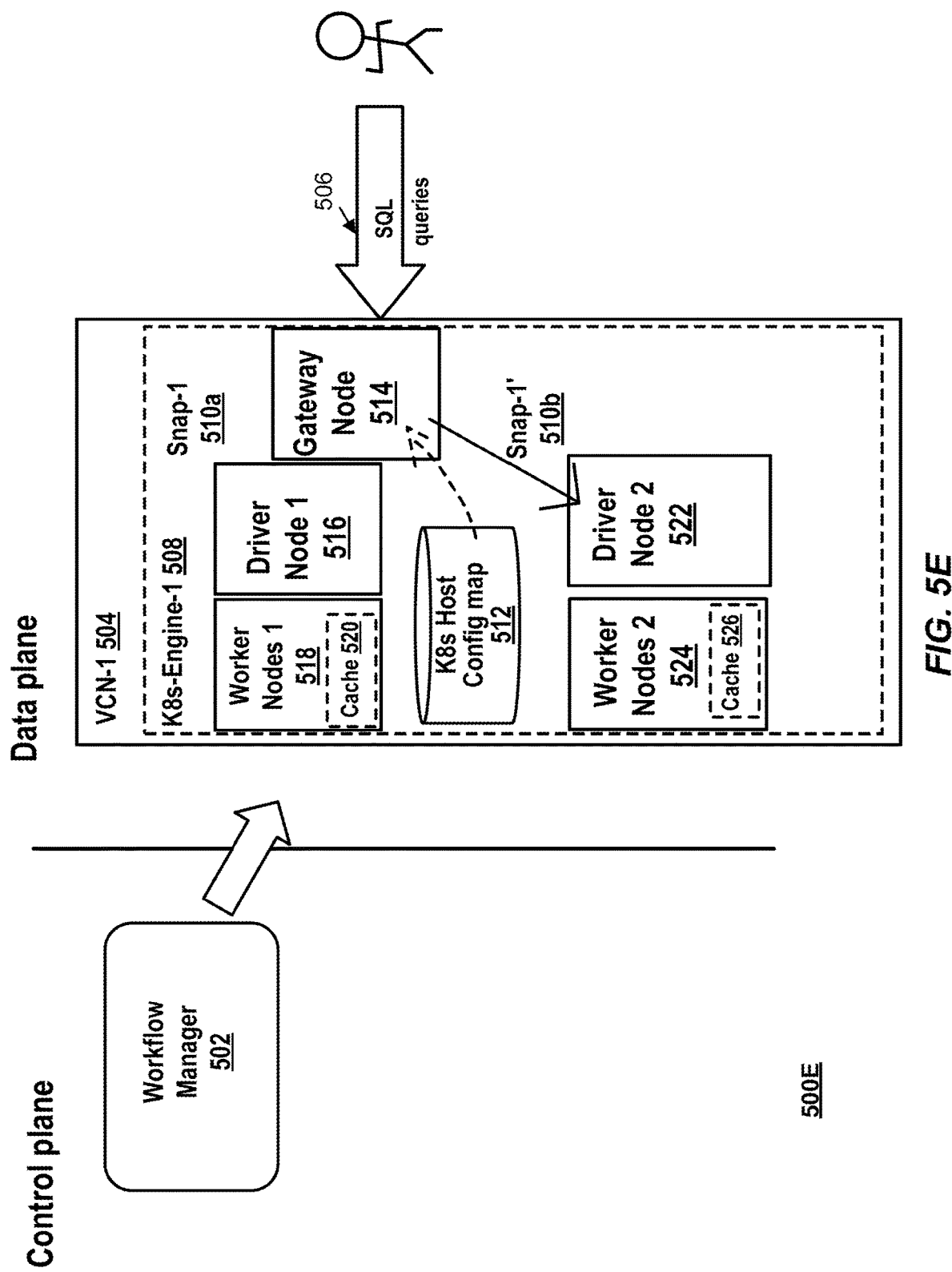

FIG. 5E illustrates a second update to the host configuration map. Once the gateway node 514 determines there are no active queries served by the old dataflow-interactive cluster, the configuration map can be updated to identify the old instance 510*a* as stale.

In some embodiments, the workflow manager 502 can cause a second update to the configuration of the host configuration node to remove the first dataflow cluster from the configuration. This can cause direction of subsequent query data from the gateway node to the second dataflow cluster. Causing the second update to the configuration can be based on determining that no active queries exist.

This can include the gateway node 514 and/or the K8s host configuration map 512 updating a configuration to mark the old backend isStale=true. Accordingly the gateway node 514 can direct all queries 506 to the new instance 510*b* (as shown by the arrow directed from gateway node 514 to driver node 2 522). An example configuration of the host configuration map is as follows:

```
[{
    Name: Snap-1-backend
    Address: 192.168.0.2
    isActive: false
    isStale: true
},{
    Name: Snap-1'-backend
    Address: 192.168.0.3
    isActive: true
    isStale: false
}]
```

Figure 5F:
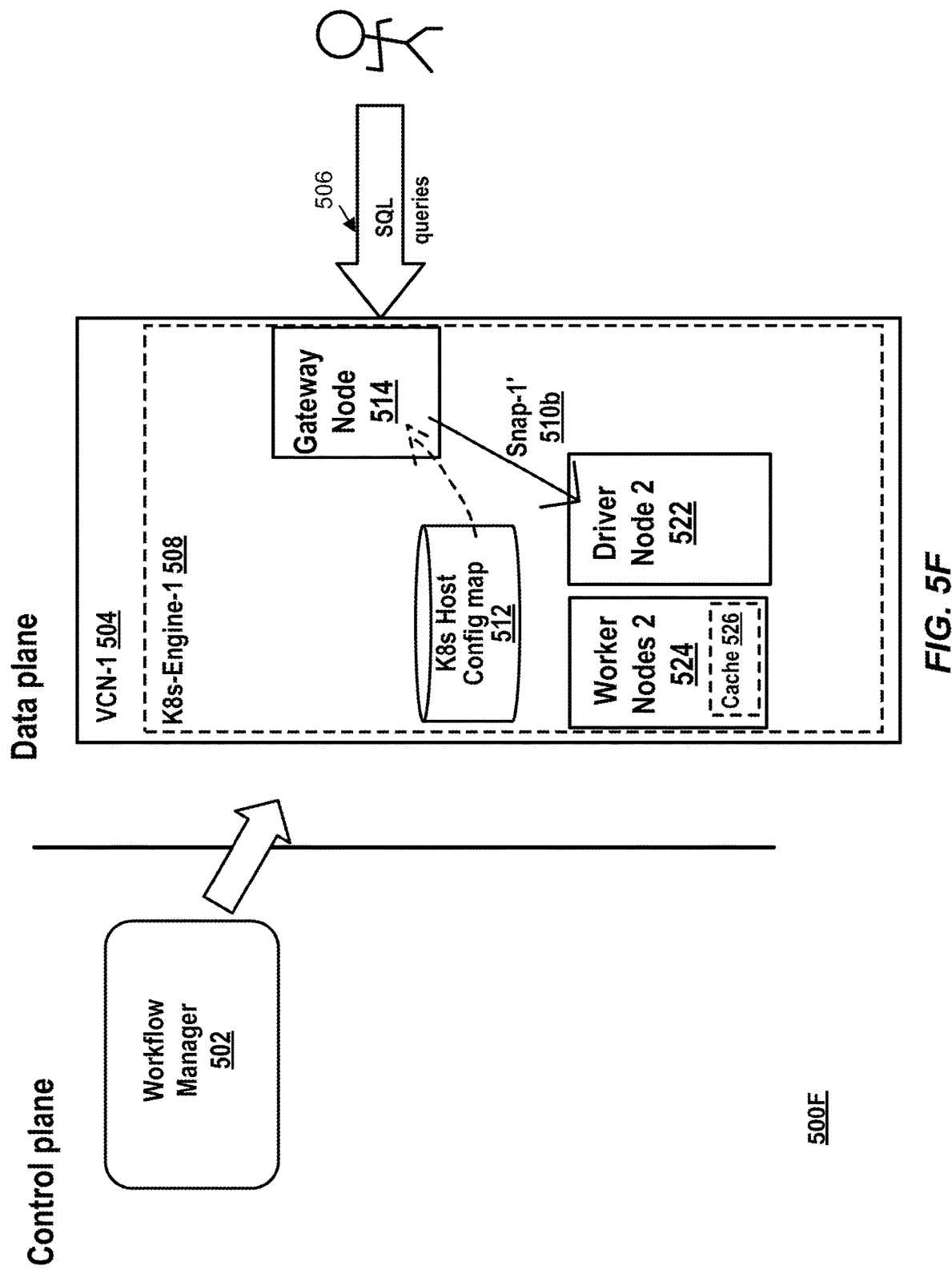

FIG. 5F illustrates a removal of a first instance. For example, responsive to completion of all active queries, the first instance (e.g., instance 1 510*a*) can be removed from the engine 508. The workflow manager 502 can poll for the host-config-map and checks for the stale backend (e.g., instance 1 510*a*). Responsive to identifying the stale backend, the configuration map can be updated to remove the first instance and a clean-up can be performed to remove the stale dataflow-interactive cluster. An example configuration of the host configuration map is as follows:

```
[{
    Name: Snap-1'-backend
    Address: 192.168.0.3
    isActive: true
    isStale: false
}]
```

Figure 6:
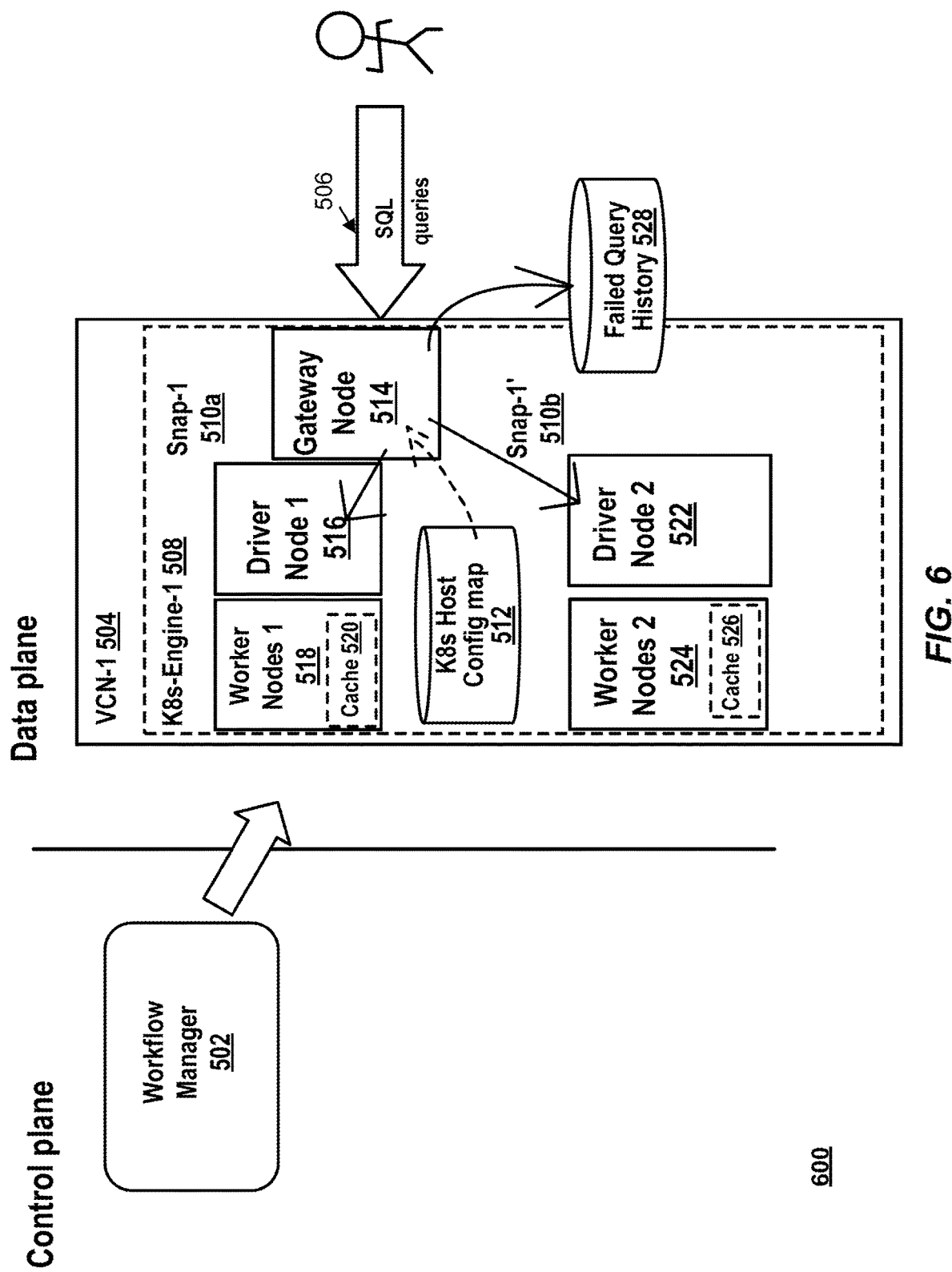
FIG. 6 is a block diagram illustrating a process for logging failed queries, according to at least one embodiment.

In some instances, execution of a query can be unsuccessful. For example, a timeout can occur for execution of a query or a set of worker nodes may be unable to perform a query. FIG. 6 illustrates a process for logging failed queries. If any query fails, gateway node 514 can log the queries into a failed query database 528. The gateway 514 can retry failed queries after completion of the update.

In some embodiments, the system can determine that execution of the first query is unsuccessful responsive to forwarding a first query to the first dataflow cluster. In other words, a gateway can determine that a first query failed. The data relating to the first query can be logged in a failed query history database responsive to determining that the execution of the first query was unsuccessful. Further, the first query can be forwarded to the second dataflow cluster for execution by the second series of executor nodes responsive to the causing of the second update to the configuration of the host configuration node.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
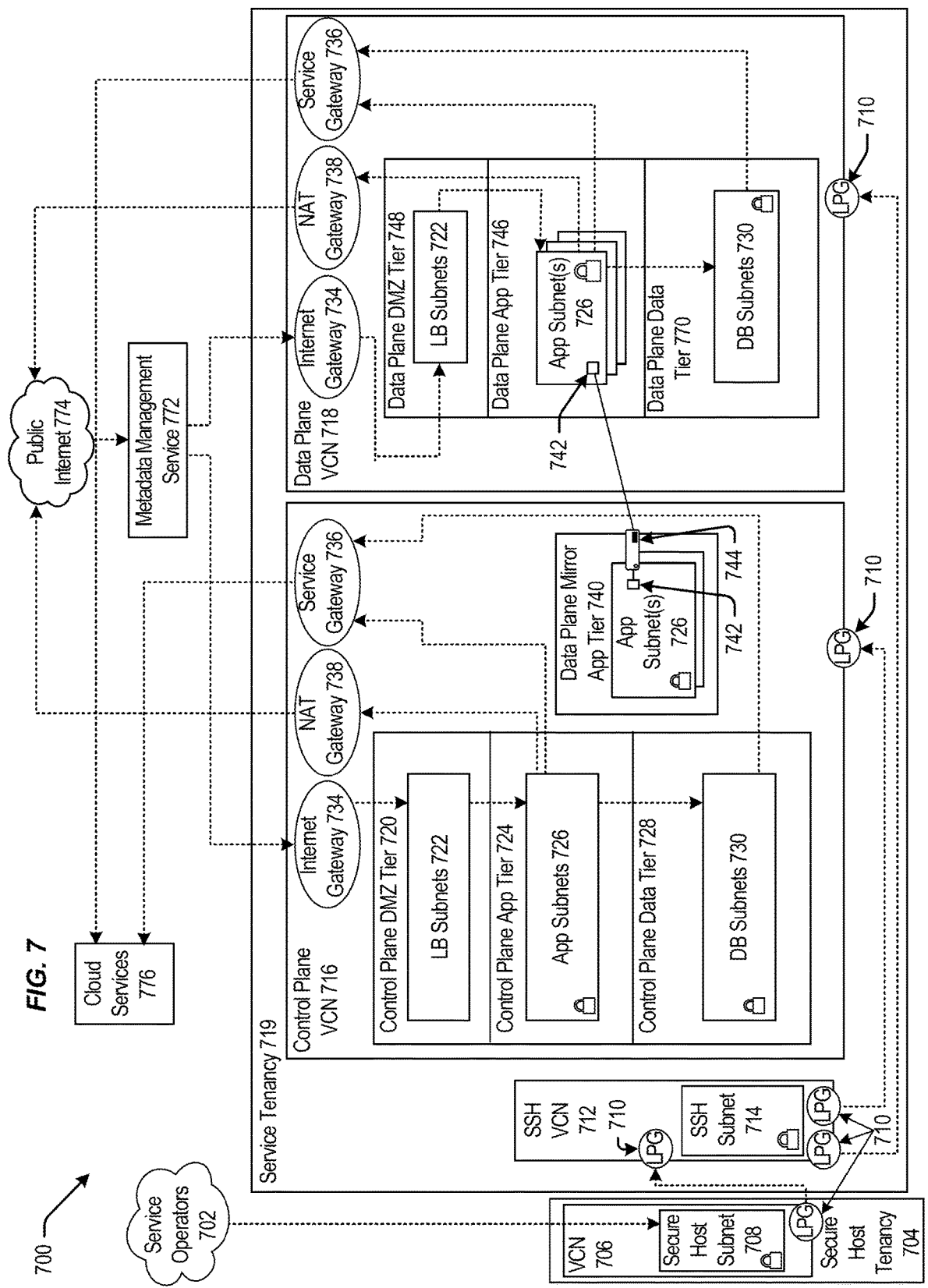
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
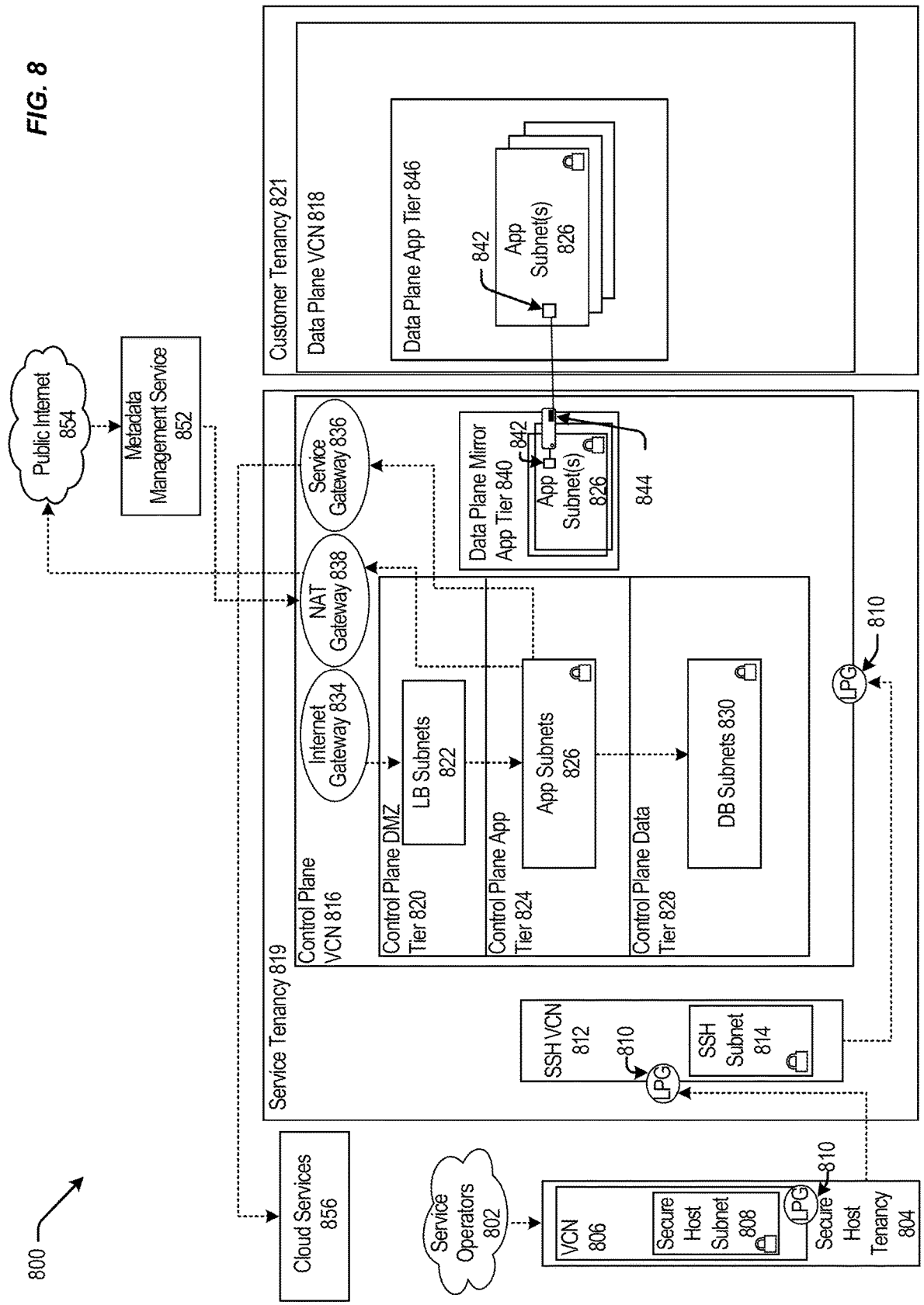
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
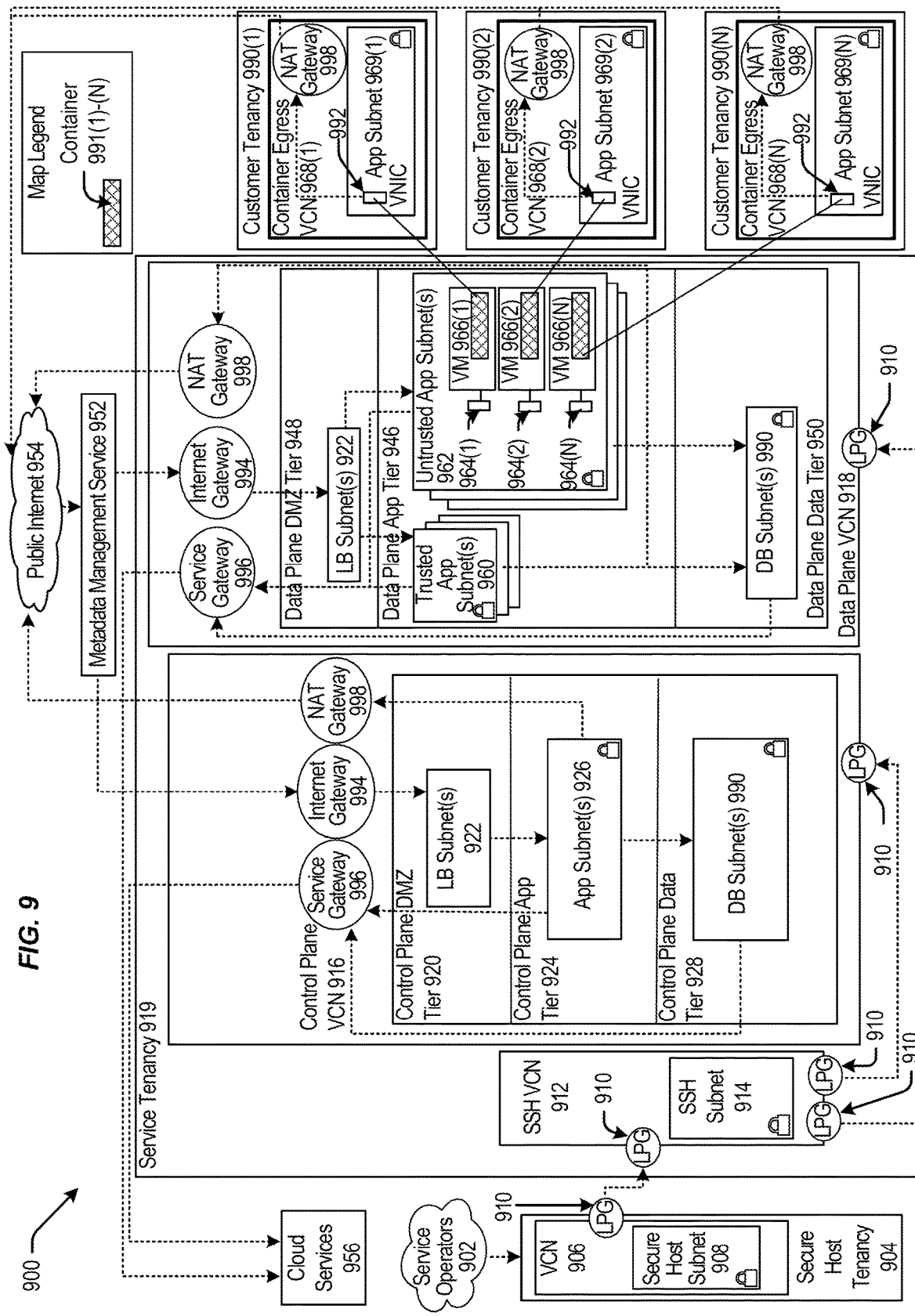
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N)

running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
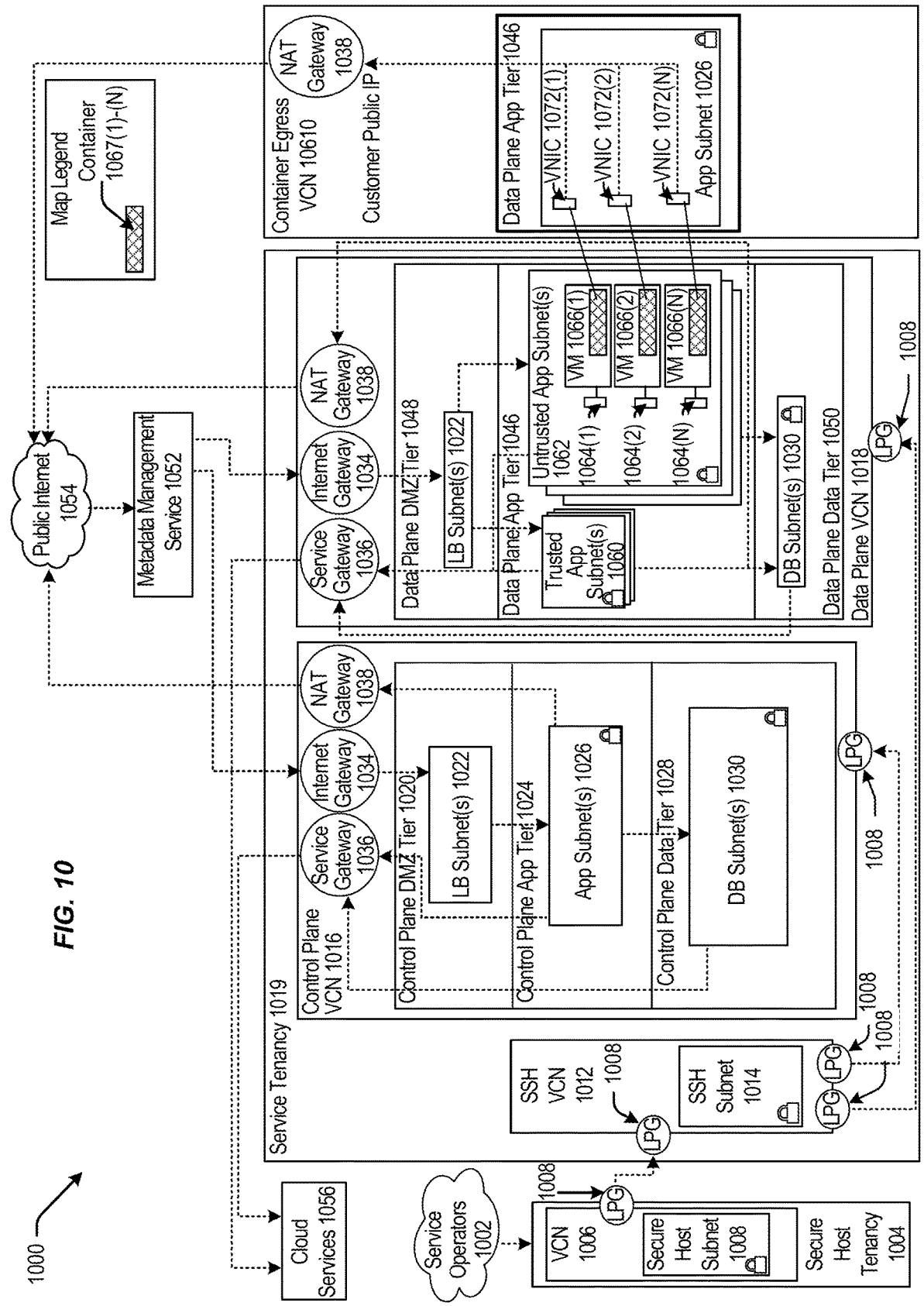
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
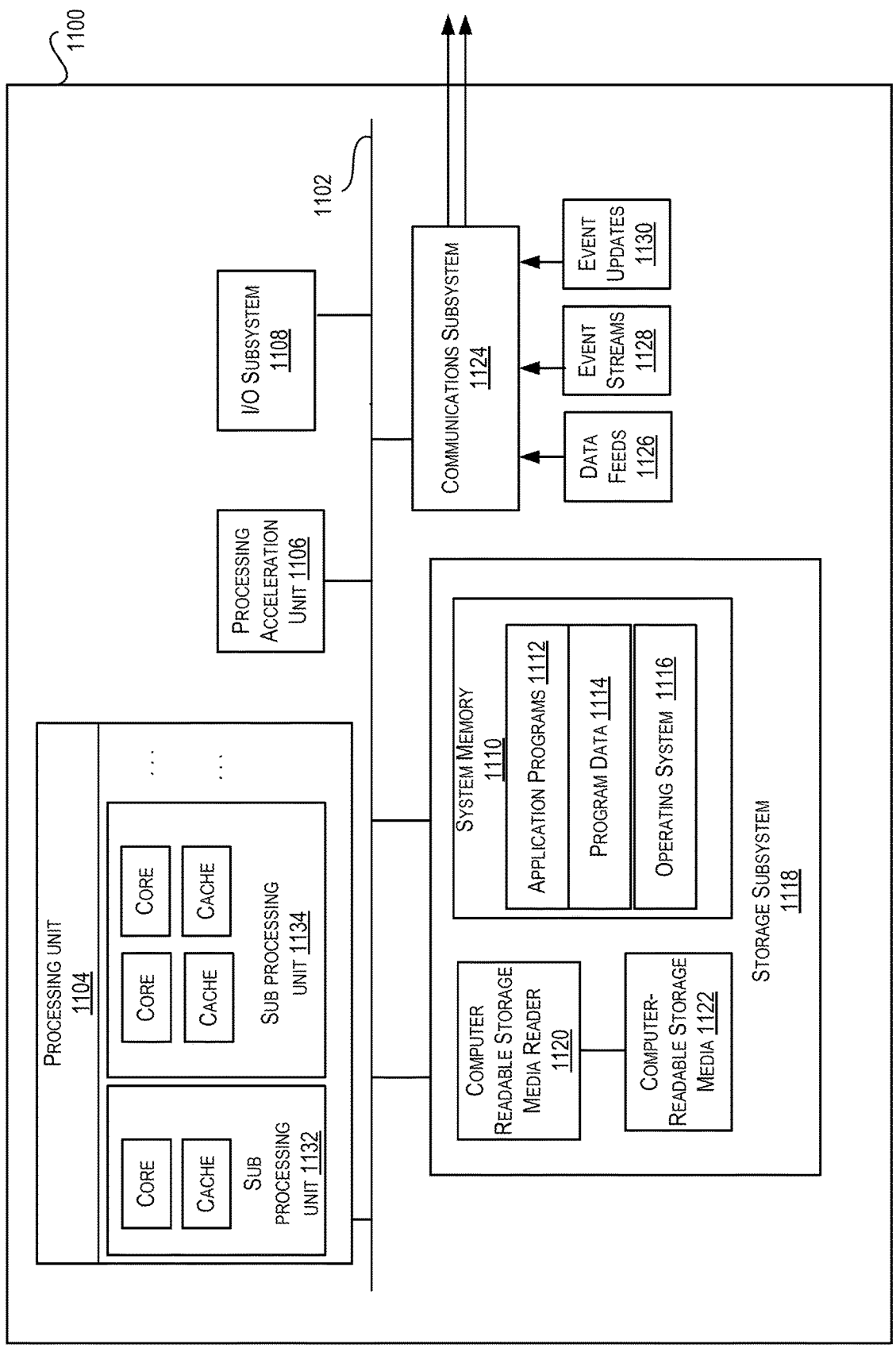
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   obtaining a request to update a first dataflow cluster, the first dataflow cluster directing query data from a gateway node to a first series of executor nodes to execute queries;
   responsive to obtaining the request to update the first dataflow cluster, generating a second dataflow cluster as a replacement to the first dataflow cluster, generating the second dataflow cluster comprising: identifying a second series of executor nodes from a new node pool that corresponds to the second dataflow cluster, the second series of executor nodes configured to execute queries from the gateway node;
   causing a first update to a configuration of a host configuration node to register the second dataflow cluster as an active endpoint for subsequent queries and identify the first dataflow cluster as an inactive endpoint; and
   responsive to determining that an upgrade timeout period has completed, causing a second update to the configuration of the host configuration node to set a stale indicator for the first dataflow cluster to be set to true;
   subsequent to the second update to the configuration of the host configuration node to set the stale indicator: polling the configuration of the host configuration node for the stale indicator for the first dataflow cluster;
   responsive to polling the configuration to determine the stale indicator is true for the first dataflow cluster, causing a third update to the configuration of the host configuration node to remove the first dataflow cluster from the configuration, causing direction of subsequent query data from the gateway node to the second dataflow cluster;
   wherein the method is performed by at least one device including a hardware processor.

2. The method of claim 1, comprising:
   responsive to determining that the upgrade timeout period has completed with one or more unfinished queries, terminating the one or more unfinished queries and logging the one or more unfinished queries into a failed query database; and
   subsequent to the third update to remove the first dataflow cluster from the configuration, retrying the one or more unfinished queries.

3. The method of claim 2, comprising:
   responsive to determining that a set of worker nodes is unable to perform a failed query, logging the failed query into the failed query database; and
   subsequent to the third update to remove the first dataflow cluster from the configuration, retrying the failed query.

4. The method of claim 1, further comprising:
   responsive to forwarding a first query to the first dataflow cluster, determining that execution of the first query is unsuccessful; responsive to determining that the execution of the first query is unsuccessful, logging data relating to the first query in a failed query history database; and responsive to the causing of the second update to the configuration of the host configuration node, forwarding the first query to the second dataflow cluster for execution by the second series of executor nodes.

5. The method of claim 1, wherein:
   the query data includes a database connectivity query and is served by the gateway node over Hypertext Transfer Protocol Secure (HTTPS), and wherein the method further comprises: responsive to determining that the database connectivity query is associated with a previously-provided query, forwarding the database connectivity query to the first dataflow cluster when the configuration provides that the first dataflow cluster is active or inactive; and responsive to determining that the database connectivity query is associated with a new query, forwarding the database connectivity query to the second dataflow cluster according to the configuration.

6. The method of claim 1, further comprising:
   polling, by the gateway node, the configuration to update a local configuration map of the gateway node.

7. The method of claim 1, wherein the upgrade timeout period is configurable.

8. One or more non-transitory computer readable media comprising instructions which, when executed by one or more hardware processors, cause performance of operations comprising:
   obtaining a request to update a first dataflow cluster, the first dataflow cluster directing query data from a gateway node to a first series of executor nodes to execute queries;
   responsive to obtaining the request to update the first dataflow cluster, generating a second dataflow cluster as a replacement to the first dataflow cluster, generating the second dataflow cluster comprising: identifying a second series of executor nodes from a new node pool that corresponds to the second dataflow cluster, the second series of executor nodes configured to execute queries from the gateway node;
   causing a first update to a configuration of a host configuration node to register the second dataflow cluster as an active endpoint for subsequent queries and identify the first dataflow cluster as an inactive endpoint; and
   responsive to determining that an upgrade timeout period has completed, causing a second update to the configuration of the host configuration node to set a stale indicator for the first dataflow cluster to be set to true;
   subsequent to the second update to the configuration of the host configuration node to set the stale indicator: polling the configuration of the host configuration node for the stale indicator for the first dataflow cluster;
   responsive to polling the configuration to determine the stale indicator is true for the first dataflow cluster, causing a third update to the configuration of the host configuration node to remove the first dataflow cluster from the configuration, causing direction of subsequent query data from the gateway node to the second dataflow cluster.

9. The non-transitory media of claim 8, the operations further comprising:
   responsive to determining that the upgrade timeout period has completed with one or more unfinished queries, terminating the one or more unfinished queries and logging the one or more unfinished queries into a failed query database; and subsequent to the third update to remove the first dataflow cluster from the configuration, retrying the one or more unfinished queries.

10. The non-transitory media of claim 9, the operations further comprising:
responsive to determining that a set of worker nodes is unable to perform a failed query, logging the failed query into the failed query database; and
subsequent to the third update to remove the first dataflow cluster from the configuration, retrying the failed query.

11. The non-transitory media of claim 8, the operations further comprising:
responsive to forwarding a first query to the first dataflow cluster, determining that execution of the first query is unsuccessful; responsive to determining that the execution of the first query is unsuccessful, logging data relating to the first query in a failed query history database; and responsive to the causing of the second update to the configuration of the host configuration node, forwarding the first query to the second dataflow cluster for execution by the second series of executor nodes.

12. The non-transitory media of claim 8, wherein:
the query data includes a database connectivity query and is served by the gateway node over Hypertext Transfer Protocol Secure (HTTPS), and wherein the operations further comprise: responsive to determining that the database connectivity query is associated with a previously-provided query, forwarding the database connectivity query to the first dataflow cluster when the configuration provides that the first dataflow cluster is active or inactive; and responsive to determining that the database connectivity query is associated with a new query, forwarding the database connectivity query to the second dataflow cluster according to the configuration.

13. The non-transitory media of claim 8, the operations further comprising:
polling, by the gateway node, the configuration to update a local configuration map of the gateway node.

14. The non-transitory media of claim 8, wherein the upgrade timeout period is configurable.

15. A system comprising:
at least one device including a hardware processor;
the system being configured to perform operations comprising:
obtaining a request to update a first dataflow cluster, the first dataflow cluster directing query data from a gateway node to a first series of executor nodes to execute queries;
responsive to obtaining the request to update the first dataflow cluster, generating a second dataflow cluster as a replacement to the first dataflow cluster, generating the second dataflow cluster comprising: identifying a second series of executor nodes from a new node pool that corresponds to the second dataflow cluster, the second series of executor nodes configured to execute queries from the gateway node;
causing a first update to a configuration of a host configuration node to register the second dataflow cluster as an active endpoint for subsequent queries and identify the first dataflow cluster as an inactive endpoint; and responsive to determining that an upgrade timeout period has completed, causing a second update to the configuration of the host configuration node to set a stale indicator for the first dataflow cluster to be set to true;
subsequent to the second update to the configuration of the host configuration node to set the stale indicator: polling the configuration of the host configuration node for the stale indicator for the first dataflow cluster;
responsive to polling the configuration to determine the stale indicator is true for the first dataflow cluster, causing a third update to the configuration of the host configuration node to remove the first dataflow cluster from the configuration, causing direction of subsequent query data from the gateway node to the second dataflow cluster.

16. The system of claim 15, the operations further comprising:
responsive to determining that the upgrade timeout period has completed with one or more unfinished queries, terminating the one or more unfinished queries and logging the one or more unfinished queries into a failed query database; and
subsequent to the third update to remove the first dataflow cluster from the configuration, retrying the one or more unfinished queries.

17. The system of claim 16, the operations further comprising:
responsive to determining that a set of worker nodes is unable to perform a failed query, logging the failed query into the failed query database; and
subsequent to the third update to remove the first dataflow cluster from the configuration, retrying the failed query.

18. The system of claim 15, the operations further comprising:
responsive to forwarding a first query to the first dataflow cluster, determining that execution of the first query is unsuccessful; responsive to determining that the execution of the first query is unsuccessful, logging data relating to the first query in a failed query history database; and responsive to the causing of the second update to the configuration of the host configuration node, forwarding the first query to the second dataflow cluster for execution by the second series of executor nodes.

19. The system of claim 15, wherein:
the query data includes a database connectivity query and is served by the gateway node over Hypertext Transfer Protocol Secure (HTTPS), and wherein the operations further comprise: responsive to determining that the database connectivity query is associated with a previously-provided query, forwarding the database connectivity query to the first dataflow cluster when the configuration provides that the first dataflow cluster is active or inactive; and responsive to determining that the database connectivity query is associated with a new query, forwarding the database connectivity query to the second dataflow cluster according to the configuration.

20. The system of claim 15, the operations further comprising:
polling, by the gateway node, the configuration to update a local configuration map of the gateway node.

* * * * *